(No Model.)
J. A. MITSCH.
NUT LOCK.
No. 442,589. Patented Dec. 9, 1890.
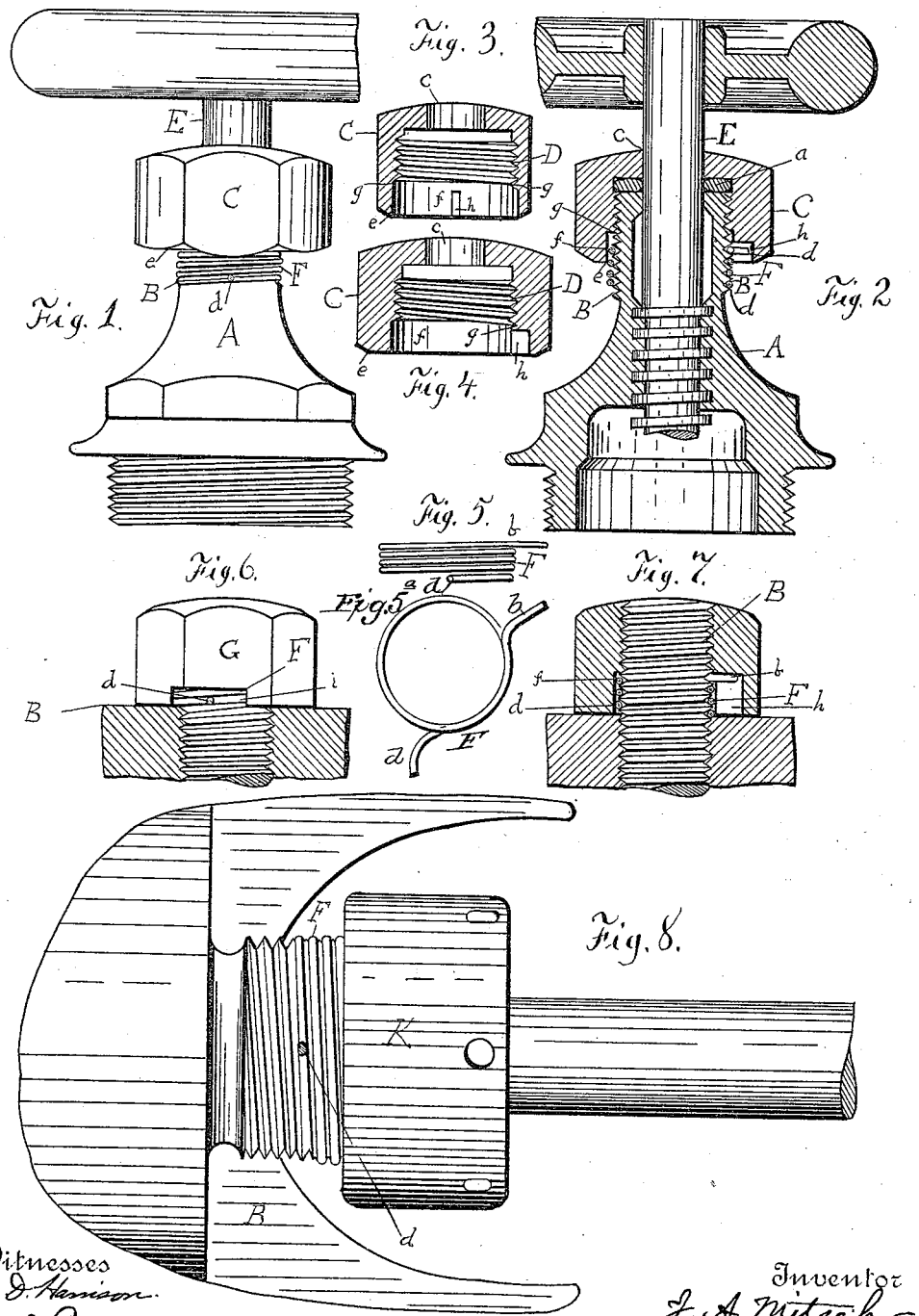

UNITED STATES PATENT OFFICE.

JOHN A. MITSCH, OF BOSTON, MASSACHUSETTS.

NUT-LOCK.

SPECIFICATION forming part of Letters Patent No. 442,589, dated December 9, 1890.

Application filed September 23, 1889. Serial No. 324,754. (No model.)

*To all whom it may concern:*

Be it known that I, JOHN A. MITSCH, of Boston, in the county of Suffolk and State of Massachusetts, have invented certain new and useful Improvements in Screw-Threads and Nut Locks, of which the following is a specification.

My invention relates to locks for screw-threads which will allow without hinderance the screwing of two devices upon each other in one direction, but which when so attached in any position relatively to each other will secure said devices from being turned in the reverse direction.

My improvements consist, generally, in combining with two devices, which are connected together by screw-threads, a coil-spring surrounding the external screw-thread and having one of its ends secured to the device having the internal screw-thread.

In the accompanying drawings, Figure 1 illustrates in side elevation my improved lock as applied to the stuffing-box and packing nut or bonnet of a valve. Fig. 2 is a vertical section of the same. Figs. 3 and 4 illustrate sectional details of the packing nut or bonnet of the valve. Fig. 5 is a side view of the coil-spring locking device. Fig. 5$^a$ is a plan of the said device. Fig. 6 illustrates my improved lock as applied to a screw-bolt and nut. Fig. 7 is a vertical section of the same. Fig. 8 illustrates my improved nut as applied to a stuffing-box and packing-nut of a steam engine or pump.

Similar letters represent like parts in all of the figures.

A, Figs. 1 and 2, is the screw-top or stuffing-box of a valve-casing, and B is the external screw-thread on the upper portion of the same.

C, Figs. 1 to 4, is the packing nut or "bonnet," having the internal screw-thread D, which engages with the external screw-thread B on the top A. The screw-thread D terminates within a short distance of the lower or inner edge $e$ of the bonnet C, and an annular recess $f$ extends from said screw-thread to said edge $e$.

E is the valve-stem, which is adapted to revolve in the vertical openings $a$ and $c$ of the stuffing-box A and bonnet C, respectively.

F is a coil-spring which encircles the screw B with the threads of said spring between the threads of said screw. The upper portion of the coil F is inclosed within the recess $f$ of the bonnet C, with the lateral shoulder $g$ of said recess abutting against the coil. The ends $b$ and $d$ of the coil F extend outward from said coil, and the upper or outer end $b$ enters a vertical groove $h$, extending upward from the edge of the bonnet C, and said end is thus prevented from lateral play relatively to said bonnet.

In Figs. 1 and 2 the projecting lower end $d$ of the coil-spring F extends below the bonnet C and is always readily accessible.

In Figs. 6 and 7, which show my improved lock as applied to a screw-bolt and nut, as the lower edge $e$ of the nut G should abut against the article to be bolted, the end $d$ of the spring F should not extend below said edge $e$ of the nut G, and in such case a lateral recess $i$ for the lateral action of the end $d$ of the coil is made in the bottom of said nut and which extends from its inner to its outer surface.

In Fig. 8 my lock is applied to a stuffing-box I and packing-nut K of a steam engine or pump in a similar manner to its application to the valve stuffing-box and bonnet, respectively, as shown in Figs. 1 and 2.

The action of the lock is as follows: When pressure is brought to bear on either end of the coil F in a direction away from said coil, the latter will be tightened immediately upon the screw B and prevented from further revolution in that direction. When, however, the pressure on either end is in the direction of the coil, the latter will be loosened upon the screw B, and will remain so, and can be readily turned in the same direction. The outwardly-projecting upper end $b$ of the coil-spring F being held in the recess or groove $h$, the turning of the nut or bonnet to the right will press upon the upper end $b$ of the coil in the direction of said coil, and thus loosen the same upon the screw B, so that the coil and the nut or bonnet may be turned. All pressure or turning in the same direction keeps the coil loose upon the screw B, and no difficulty is experienced in turning the bonnet or nut upon said screw in this direction.

When, however, the nut is endeavored to be turned to the left, the pressure upon the upper end b of the coil in a direction away from the same will immediately bind it upon the screw B, and it and the nut or bonnet will be locked or prevented from turning in this direction.

Pressure upon the end d in a direction to loosen the coils of the spring will permit the ready removal of the nut or other device locked by the spring, and thus admit of the constant use of the spring under all circumstances of application and removal.

My improved lock may be applied to a left-handed screw as well as a right-handed one, as shown in the drawings, and in this case the locking of a nut or cap upon the external screw-thread will be accomplished by turning said cap or nut and the coil-spring to the right and the unlocking of the same by turning them to the left, as will be readily seen.

My improved lock may be applied to any two devices which are connected together by an interior and exterior screw-thread.

What I claim as new, and desire to secure by Letters Patent, is—

The within-described nut-lock, consisting of the coiled spring F, having the projecting end b, adapted to engage a nut or other object to be locked, and also having the projecting end d, extending beyond the object to be locked and adapted to receive pressure to loosen the spring to permit the removal of the nut and spring without injury to the spring, substantially as set forth.

In testimony whereof I have signed my name to this specification, in the presence of two subscribing witnesses, this 19th day of September, A. D. 1889.

JOHN A. MITSCH.

Witnesses:
W. C. RAMSAY,
PENNINGTON HALSTED.